United States Patent
Song

(10) Patent No.: US 7,628,362 B2
(45) Date of Patent: Dec. 8, 2009

(54) ADHESION DEVICE BY HOLDING LOW PRESSURE

(76) Inventor: Soon Young Song, Hyundai Apt. 101/102, Sadong-ri, Daewol-myeon, Icheon-si (KR) 467-854

( * ) Notice: Subject to any disclaimer, the term of this patent is extended or adjusted under 35 U.S.C. 154(b) by 114 days.

(21) Appl. No.: 11/819,502

(22) Filed: Jun. 27, 2007

(65) Prior Publication Data
US 2008/0224009 A1  Sep. 18, 2008

(30) Foreign Application Priority Data
Mar. 13, 2007  (KR)  .................. 10-2007-0024409

(51) Int. Cl.
*A45D 42/14*  (2006.01)
*F16B 47/00*  (2006.01)
(52) U.S. Cl. .............. 248/205.8; 248/205.5; 248/206.2; 248/363
(58) Field of Classification Search ... 248/205.5–205.9, 248/206.1, 206.2, 206.3, 206.4, 683, 467, 248/362, 363
See application file for complete search history.

(56) References Cited
U.S. PATENT DOCUMENTS 4,133,575 A * 1/1979 Mader ........................ 296/95.1
5,961,087 A * 10/1999 Lee ............................ 248/362
6,234,435 B1 * 5/2001 Yeh ........................... 248/205.5
7,066,434 B2 * 6/2006 Kwok ....................... 248/205.8
7,293,750 B2 * 11/2007 Richter .................... 248/205.5
2007/0023594 A1 * 2/2007 Choi et al. ............... 248/205.5

\* cited by examiner

*Primary Examiner*—Gwendolyn Baxter
(74) *Attorney, Agent, or Firm*—Rabin & Berdo, PC

(57) ABSTRACT

Provided is an adhesion device used to cradle a car navigation system, a mobile phone, etc. The adhesion device according to the present invention comprises a pad (21) having a bottom surface attached to an adhesion surface, a center element (23) fixed upright at the center of the top surface of the pad (21), a housing (22) placed on the top surface of the pad (21) and having a hole through which the center element (23) passes, a ring-shaped leaf spring (27) which is equipped at the outer circumference of the housing (22) and presses the outer circumference of the top surface of the pad (21) and an adhesion controller (24) connected with the top end of the center element (23) by an axis (24c). The adhesion controller (24) comprises a lever (24a) and a press (24b). When the lever (24a) is rotated around the axis (24c), the press (24b) presses down the top surface of the housing (22) and the center of the pad (21) connected with the center element (23) is moved upward, resulting in an expansion of the space between the pad (21) and the adhesion surface and a pressure lower than the atmospheric pressure.

4 Claims, 3 Drawing Sheets

[Fig. 1]
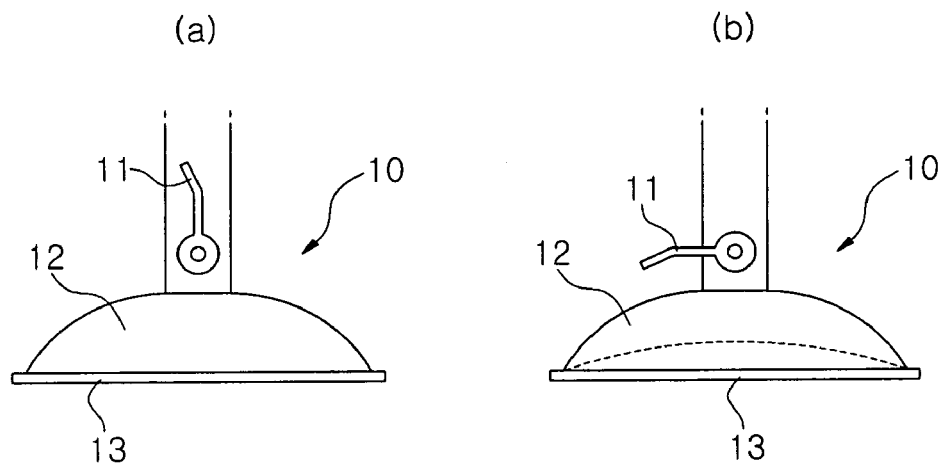
[Fig. 2]
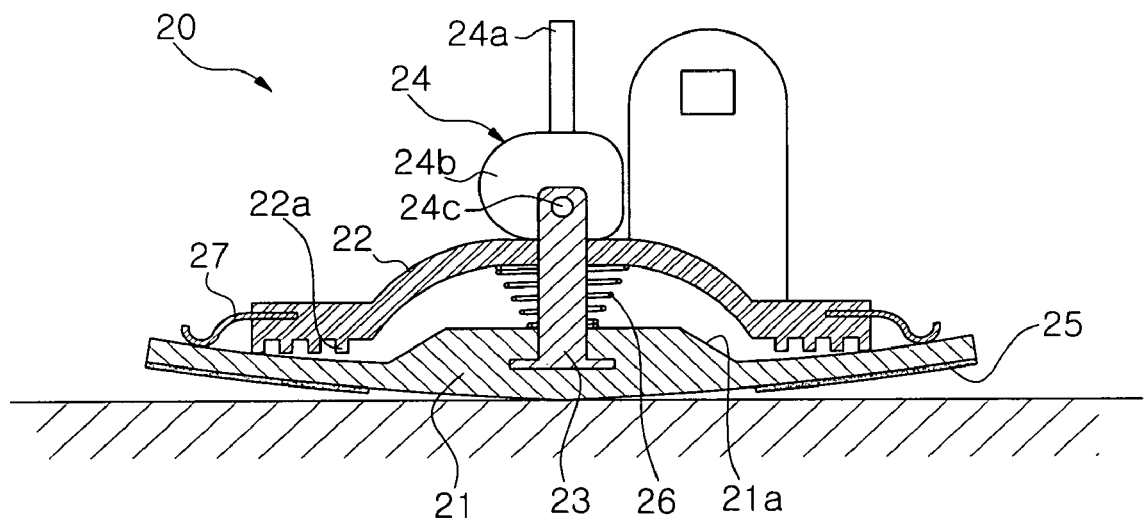

[Fig. 3]
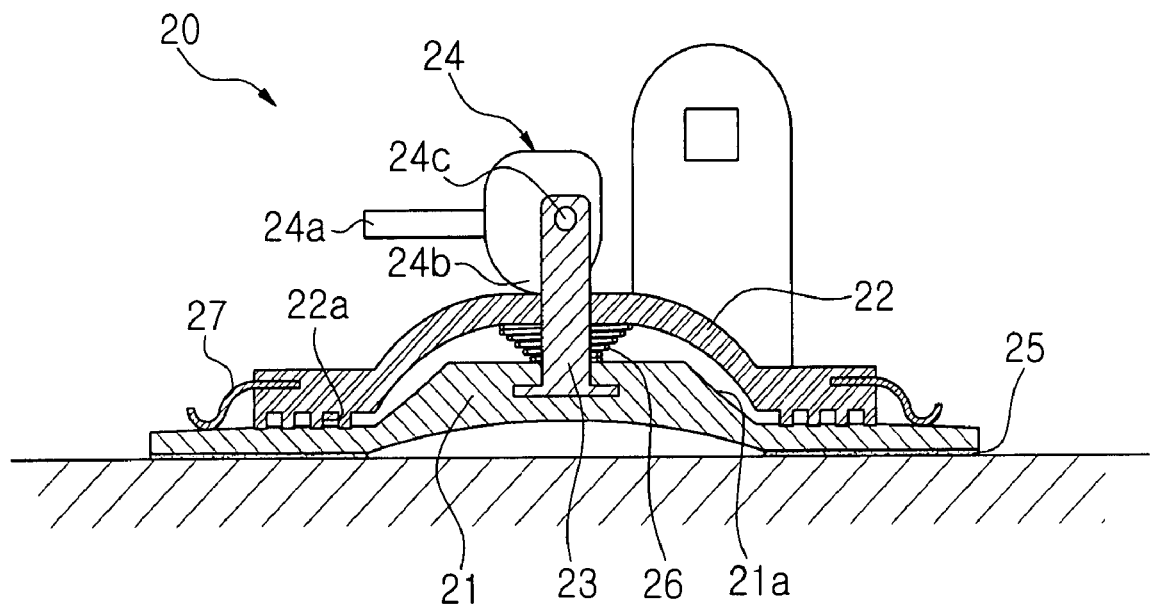
[Fig. 4]
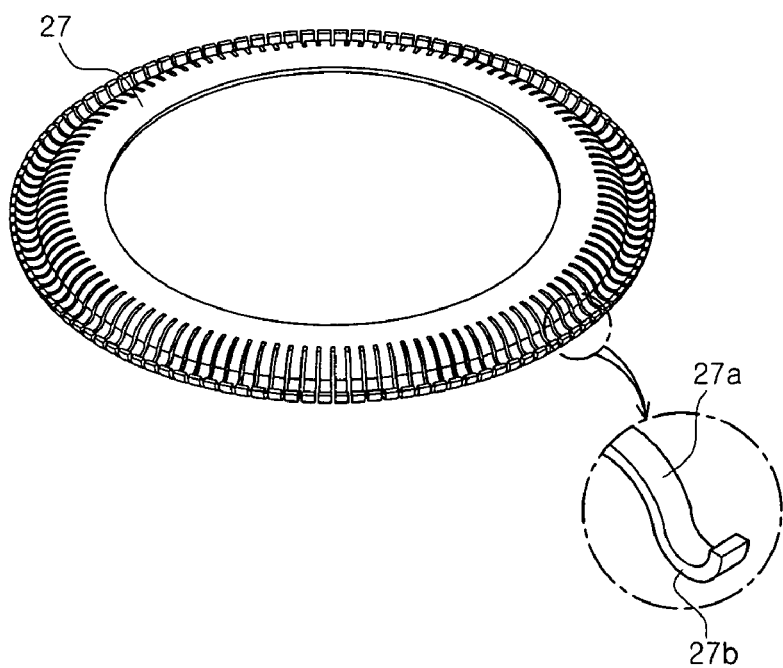

[Fig. 5]
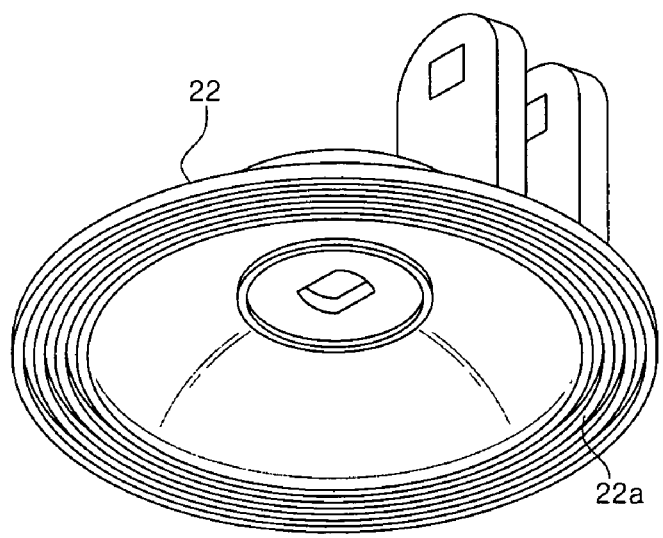
[Fig. 6]
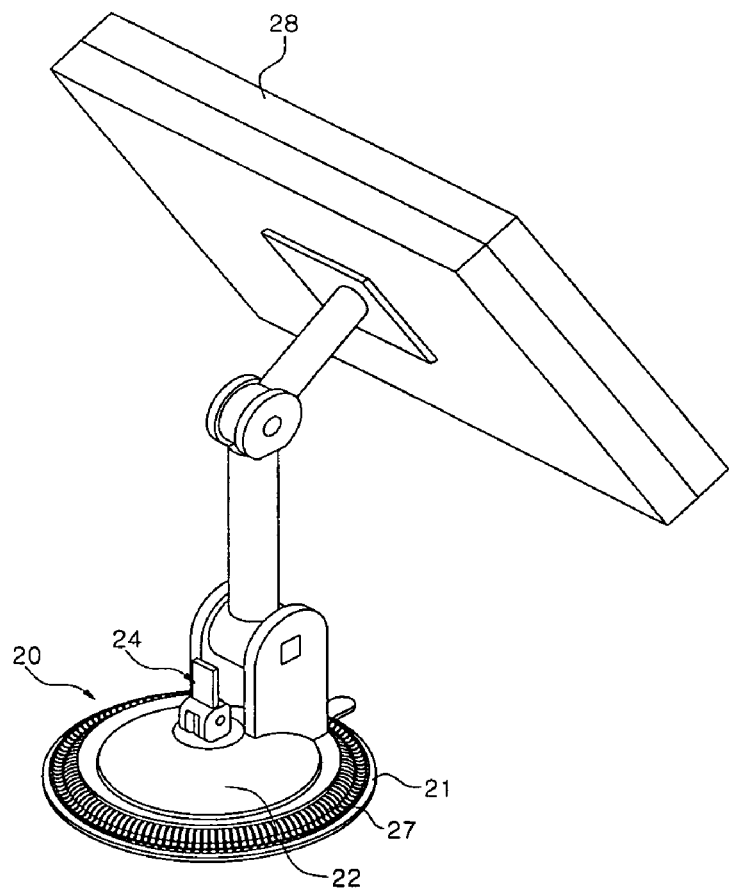

ADHESION DEVICE BY HOLDING LOW PRESSURE

TECHNICAL FIELD

The present invention relates to an adhesion device used to firmly attach an article on a surface. More particularly, it relates to an adhesion device to cradle a navigation system, a monitor, and so forth.

BACKGROUND ART

Recently, a lot of car drivers use mobile phones, navigation systems, monitors, etc. by attaching them on the front windowpane, dashboard, etc. An adhesion device as illustrated in FIG. 1 is used to attach them. FIG. 1a shows the status before the adhesion device is attached on an adhesion surface and FIG. 1b shows the status after the adhesion device has been attached. Referring to FIG. 1a, the adhesion device (10) comprises a housing (12) and a suction plane (13). Above the housing (12) is a support connector for cradling a mobile phone, a navigation system, and so forth. The support connector is equipped with a lever (11). At the center of the suction plane (13), the suction plane (13) is connected with the lever (11) by a center element (not illustrated). When the lever (11) is pressed down, the center of the suction plane (13) connected with the lever (11) is pulled toward the housing (12), resulting in a curved shape as illustrated by the broken line in FIG. 1b. Consequently, the inner space between the suction plane (13) and the adhesion surface is expanded, resulting in a lower air pressure between the suction plane (13) and the adhesion surface than the atmospheric pressure and the attachment of the adhesion device (10) to the adhesion surface.

However, the conventional adhesion device (10) is disadvantageous in that, since air exists in the inner space between the suction plane (13) and the adhesion surface prior to attaching the adhesion device (10) as seen in FIG. 1, it is difficult to attain a strong adhesion force because it is not easy to lower the pressure inside the inner space close to vacuum by expanding the inner space. And, if the ambient temperature rises because of hot weather, etc., the temperature of the air inside the inner space increases and so does the air pressure inside the inner space, resulting in a weaker adhesion force and detachment of the adhesion device (10) from the adhesion surface.

Further, the conventional adhesion device (10) is attached only on a smooth surface like glass and it is difficult to fix the adhesion device (10) on a relatively rough surface like a dashboard. Particularly, it is not easy to attach the adhesion device on a curved, not flat, adhesion surface. The windowpane or dashboard of a car is not completely flat but curved and it is almost impossible to firmly attach the conventional adhesion device on such a curved surface.

DISCLOSURE OF THE INVENTION

The present invention has been made to solve these problems and it is an object of the present invention to provide an adhesion device capable of providing and maintaining a stronger and more effective adhesion force by maintaining the pressure between the adhesion surface and the adhesion device lower than the atmospheric pressure or close to vacuum and of offering an effective adhesion to a relatively rough or uneven adhesion surface like a dashboard of a car.

BRIEF DESCRIPTION OF DRAWINGS

FIG. 1 illustrates a conventional adhesion device before and after being attached to an adhesion surface.

FIG. 2 is a cross-sectional side view of the adhesion device according to the present invention before being attached to an adhesion surface.

FIG. 3 is a cross-sectional side view of the adhesion device according to the present invention after being attached to an adhesion surface.

FIG. 4 is a perspective view and a partial enlargement view of the leaf spring according to the present invention.

FIG. 5 shows the inside of the housing according to the present invention.

FIG. 6 is a perspective view of a car navigation system perched on the adhesion device according to the present invention.

BEST MODE FOR CARRYING OUT THE INVENTION

Now, the adhesion device of the present invention is described in detail referring to FIGS. 2 to 8.

FIG. 2 is a cross-sectional side view of the adhesion device according to the present invention before being attached to an adhesion surface. The adhesion device comprises a pad (21), a center element (23), a housing (22) and an adhesion controller (24). The pad (21) has a bottom surface which is attached to the adhesion surface and a top surface connected with the center element (23). The center element (23) is fixed upright at the center of the top surface of the pad (21). The housing (22) has a round semi-spherical shape and has a hole through which the center element (23) passes at the center. The adhesion controller (24) comprises a lever (24a) and a press (24b) and is capable of rotating around an axis (24c) as connected to the center element (23) at the top end. In the adhesion device according to the present invention, the housing (22) is located at the top surface of the pad which is put on the adhesion surface. The top end of the center element (23) which is connected with the top surface of the pad (21) passes through the hole at the center of the housing (22) and is connected with the adhesion controller (24).

The adhesion device according to the present invention is attached on the adhesion surface as follows. The adhesion device is put on the adhesion surface and the lever (24a) of the adhesion controller (24) is rotated around the axis (24c). Then, the press (24b) presses down the top surface of the housing (22), resulting in an upward movement of the center element (23) connected with the adhesion controller (24) and an upward movement of the pad (21) connected with the center element (23). Since the bottom surface of the pad (21) of the adhesion device is closely adhered to the adhesion surface, the space between the bottom surface of the pad (21) and the adhesion surface is expanded and the air pressure of the airtight space becomes lower than the outside atmospheric pressure. The pressure difference between the outside and inside ensures that the adhesion device of the present invention remains attached to the adhesion surface.

In order to sustain the adhesion status, it is important to keep the outer circumference of the bottom surface of the pad (21) and the adhesion surface airtight. For this purpose, a ring-shaped leaf spring (27) as illustrated in FIG. 4 is employed in the present invention. It is equipped at the outer circumference of the housing (22) and presses the outer circumference at the top surface of the pad (21).

The ring-shaped leaf spring (27) has a shape of a round ring. Its inner circumference is connected but its outer circumference is separated and forms branches (27a). The inner circumference of the leaf spring (27) is fixed as equipped at the outer circumference of the housing (22) of the adhesion device. At the end of the branches (27a) are formed downwardly convex bights (27b). When the leaf spring (27) presses the top surface of the pad (21), the bights (27b) press the outer circumference of the top surface of the pad (21). Accordingly, when the adhesion device is attached on the adhesion surface, a pressing force is provided to the top surface of the pad (21) by the outer circumference the bottom surface of the housing and/or by the leaf spring. The characteristic shape of the leaf spring enables the bottom surface of the pad (21) and the adhesion surface to remain airtight even when the adhesion surface is curved, not completely flat. In other words, since the branches (27a) of the leaf spring (27) are separated from one another, each of the branches (27a) can provide different pressing force to the pad (21) as required to attach the pad (21) to the adhesion surface. Thus, the adhesion device according to the present invention can be attached on a curved adhesion surface.

And, in order to make the outer circumference of the bottom surface of the pad (21) and the adhesion surface more airtight, the housing (22) may have more than one trunnion (22a) at the bottom contacting the pad (21), as illustrated in FIG. 5. In the adhesion device according to the present invention, the center of the pad (21) at which it is connected with the center element (23) is made thicker than the outer circumference. And, the top surface of the pad (21) is tapered at the center toward the outer circumference in order to provide better durability to the center of the pad (21), which may become structurally weak when the adhesion device is used repeatedly.

Further, in the adhesion device according to the present invention, the bottom surface of the pad (21) has a convex shape at the center in order to make the inner space between the pad (21) and the adhesion surface almost vacuous when the adhesion device is attached to the adhesion surface. Therefore, when the adhesion device is attached to the adhesion surface, the air pressure inside the inner space becomes much lower than the atmospheric pressure, resulting in a stronger adhesion.

Further, an adhesive industrial gel (25) is provided at the outer circumference of the bottom surface of the pad (21). The industrial gel (25) (hardness: 30 to 35) is made of the same, but a little softer, material of the main component of the pad. The industrial gel may be an elastomer comprising isocyanate, a hardener like polyol and a plasticizer like ether or ester. Depending on the content of the plasticizer, the industrial gel has a hardness different from that of the pad (21) and the industrial gel becomes adhesive. The adhesiveness of the industrial gel provides and sustains further stronger adhesion of the adhesion surface and the pad (21), resulting in effective adhesion even on a rough surface like a dashboard.

The adhesion device according to the present invention may further comprise a coil spring (26) surrounding the center element (23) between the housing (22) and the pad (21). Before the adhesion device is attached to the adhesion surface, the spring applies a downward force to the pad (21) and makes the bottom surface of the pad (21) downwardly convex. As a result, a stronger adhesion between the adhesion surface and the pad can be attained.

INDUSTRIAL APPLICABILITY

The housing of the adhesion device of the present invention is equipped with a leaf spring having a characteristic shape. The leaf spring has branches with downwardly convex bights at the outer circumference. Since these bights apply pressing force to the outer circumference at the top surface of the pad, the adhesion device according to the present invention can be attached to a curved adhesion surface. And, the adhesive industrial gel provided at the bottom surface of the outer circumference of the pad offers a stronger adhesion between the adhesion surface and the pad, resulting in an effective adhesion even on a rough surface like dashboard. Further, the convex shape of the bottom surface of the pad ensures a stronger adhesion between the adhesion surface and the pad.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. An adhesion device comprising:
a pad (21) having a bottom surface attached to an adhesion surface;
a center element (23) fixed upright at the center of the top surface of the pad (21);a housing (22) placed on the top surface of the pad (21) and having a hole through which the center element (23) passes;
a ring-shaped leaf spring (27) which is equipped at the outer circumference of the housing (22) and presses the outer circumference of the top surface of the pad (21); and
an adhesion controller (24) connected with the top end of the center element (23) by an axis (24c), wherein the adhesion controller (24) comprises a lever (24a) and a press (24b), such that, when the lever (24a) is rotated around the axis (24c), the press (24b) presses down the top surface of the housing (22) and the center of the pad (21) connected with the center element (23) is moved upward, resulting in an expansion of the space between the pad (21) and the adhesion surface and a pressure lower than the atmospheric pressure,
wherein the ring-shaped leaf spring (27) has separated branches (27a) at the outer circumference and the branches (27a) are equipped with bights (27b) that press the top surface of the pad (21).

2. The adhesion device as set forth in claim 1, wherein the center of the pad (21), which is connected with the center element (23), is thicker than the outer circumference and the top surface of the pad (21) is tapered at the center toward the outer circumference.

3. The adhesion device as set forth in claim 1, wherein the pad (21) is convex at the bottom surface and an adhesive industrial gel (25) is provided at the outer circumference of the bottom surface of the pad (21).

4. The adhesion device as set forth in claim 1, wherein at least one trunnion (22a) is formed at the bottom of the housing (22) which contacts the pad (21) and a coil spring (26) surrounding the center element (23) is further equipped between the housing (22) and the pad (21).

* * * * *